(12) United States Patent
Sakata

(10) Patent No.: US 7,512,327 B2
(45) Date of Patent: Mar. 31, 2009

(54) IMAGE CAPTURING DEVICE HAVING BLURRING CORRECTION FUNCTION AND BLURRING CORRECTION METHOD

(75) Inventor: Seiichiro Sakata, Akiruno (JP)

(73) Assignee: Olympus Imaging Corp., Tokyo (JP)

( * ) Notice: Subject to any disclaimer, the term of this patent is extended or adjusted under 35 U.S.C. 154(b) by 494 days.

(21) Appl. No.: 11/320,178

(22) Filed: Dec. 28, 2005

(65) Prior Publication Data

US 2006/0153552 A1 Jul. 13, 2006

(30) Foreign Application Priority Data

Jan. 13, 2005 (JP) .............................. 2005-006402

(51) Int. Cl.
G03B 17/00 (2006.01)
H04N 5/228 (2006.01)
G02B 27/64 (2006.01)

(52) U.S. Cl. ...................... 396/52; 396/55; 348/208.99; 359/554

(58) Field of Classification Search ............. 396/52–55, 396/133; 348/208, 208.99, 335; 359/554, 359/557; 250/280.1
See application file for complete search history.

(56) References Cited

U.S. PATENT DOCUMENTS

| | | | |
|---|---|---|---|
| 4,894,579 A | 1/1990 | Higuchi et al. | 310/328 |
| 5,822,623 A | 10/1998 | Urata et al. | 396/52 |
| 5,850,575 A * | 12/1998 | Ohishi | 396/52 |
| 6,320,298 B1 | 11/2001 | Kawabe | 310/317 |
| 6,778,766 B2 * | 8/2004 | Tomita | 396/55 |

FOREIGN PATENT DOCUMENTS

| | | |
|---|---|---|
| CN | 1139858 | 1/1997 |
| JP | 63-299785 | 12/1988 |
| JP | 08-223471 | 8/1996 |
| JP | 2002-290816 | 10/2002 |

OTHER PUBLICATIONS

Chinese Office Action to Chinese Patent Application No. 2006100011177, mailed Jun. 29, 2007 (8 pgs.) with translation (8 pgs.).

* cited by examiner

Primary Examiner—Melissa J Koval
(74) Attorney, Agent, or Firm—Straub and Pokotylo; John C. Pokotylo

(57) ABSTRACT

An image capturing device and a blurring correction method in which an imaging unit or a blurring correction optical system is driven to correct blurring in response to an output of a vibration detecting sensor. In such blurring correction, when a driving mechanism has a frictionally connected section, the blurring correction impairs an image at a time when an impact is generated. Therefore, an impact detecting section is disposed, and the blurring correction is not performed when the impact detecting section detects the impact.

12 Claims, 13 Drawing Sheets

IMAGE CAPTURING DEVICE HAVING BLURRING CORRECTION FUNCTION AND BLURRING CORRECTION METHOD

CROSS-REFERENCE TO RELATED APPLICATION

This application is based upon and claims the benefit of priority from prior Japanese Patent Application No. 2005-006402, filed on Jan. 13, 2005, the entire contents of which are incorporated herein by reference.

BACKGROUND OF THE INVENTION

1. Field of the Invention

The present invention relates to a method of controlling an actuator for reciprocating a driving member by expansions and contractions of an electromechanical conversion unit, and an image capturing device having such an actuator. The present invention relates more particularly to an image capturing device provided with an image blurring correction function, and a blurring correction method.

2. Description of the Related Art

There has been known a piezoelectric actuator in which a driving section is fixed to an electromechanical conversion unit such as a piezoelectric ceramic, a member of the driving section (a driving member) is reciprocated and displaced by expansion and contraction movements of the electromechanical conversion unit caused by an applied driving signal, and a movable member frictionally connected to the driving member is moved in the direction of the expansion and contraction movements. Such actuator is disclosed in, for example, Japanese Patent Application Laid-Open No. 63-299785.

The principle of driving the above-described piezoelectric actuator will be described with reference to FIGS. 12A to 15.

As shown in FIG. 12A, a left end portion of a piezoelectric ceramic 2 is fixed to a fixing member 1, and a driving shaft (driving member) 3 is fixed to a right end portion of the piezoelectric ceramic 2. This driving shaft 3 is supported by a supporting member (not shown) so as to be movable in an axial direction (lateral direction in FIG. 12). Moreover, a movable member (frictional member) 4 is frictionally connected to the driving shaft 3 (i.e., the movable member 4 does not displace with respect to the driving shaft 3 because of the frictional force between them, but displace when force larger than the frictional force is applied).

On the other hand, a driving signal for expanding and contracting the piezoelectric ceramic 2 is supplied from a driving circuit 5 to an electrode of the piezoelectric ceramic 2.

Next, there will be described a case where the movable member 4 is moved rightwards with reference to FIGS. 12A to 13.

When the movable member 4 is driven rightwards, a sawtooth-shaped driving pulse signal is supplied from the driving circuit 5 to the piezoelectric ceramic 2 as shown in a timing chart of FIG. 13. A change ratio of voltage differs between a rising side (*1) and a falling side (*2) in a waveform of the driving pulse signal. During rapid rising (*1) of the driving pulse signal applied to the piezoelectric ceramic 2, as shown in FIG. 12B, the piezoelectric ceramic 2 shortens leftwards of FIG. 12 rapidly (at high speed). Here, since the speed of the shortening of the piezoelectric ceramic 2 is rather high, an inertial force to hold the movable member 4 in the corresponding position overcomes a frictional connecting force, and the movable member 4 remains in an initial position shown in FIG. 12A.

Next, a moderate falling voltage (*2) of the driving pulse is applied. While the driving pulse signal applied to the piezoelectric ceramic 2 moderately falls in this manner, as shown in FIG. 12C, the piezoelectric ceramic 2 elongates rightwards moderately (at low speed). In this case, as shown in FIG. 12C, the movable member 4 frictionally connected to the driving shaft 3 moves rightwards (direction of arrow A1 in the drawing) together with the driving shaft 3.

Therefore, to move the movable member 4 rightwards by a desired distance (movement amount S), necessary number of the driving pulse signals should be supplied from the driving circuit 5.

Next, there will be described a case where the movable member 4 is moved leftwards with reference to FIGS. 14A to 15.

When the movable member 4 is moved leftwards, a sawtooth-shaped driving pulse signal is supplied from the driving circuit 5 as shown in a timing chart of FIG. 15. The pulse signals shown in FIGS. 15 and 13 have symmetric waveforms with respect to the GND level taken as a base level.

The change ratio of the voltage differs between a falling side (*1') and a rising side (*2') of a waveform of the driving pulse signal. During rapid falling (*1') of the driving pulse signal applied to the piezoelectric ceramic 2, as shown in FIG. 14B, the piezoelectric ceramic 2 elongates rightwards rapidly (at high speed) in the drawing. Here, since the speed of the elongating of the piezoelectric ceramic 2 is rather high, an inertial force to hold the movable member 4 in the corresponding position overcomes a frictional connecting force, and the member remains in an initial position shown in FIG. 14A.

Next, a moderate rising voltage (*2') of the driving pulse is applied. While the driving pulse signal applied to the piezoelectric ceramic 2 moderately rises in this manner, the piezoelectric ceramic 2 shortens moderately (at low speed). In this case, as shown in FIG. 14C, the movable member 4 frictionally connected to the driving shaft 3 moves leftwards (direction of arrow A2 in the drawing) together with the driving shaft 3.

Therefore, to move the movable member 4 leftwards by a desired distance (movement amount S), necessary number of the driving pulse signals should be supplied from the driving circuit 5.

As described above, when the positive or negative sawtooth-shaped pulse voltages are applied, the movable member 4 can be moved leftwards or rightwards.

In addition, a blurring correction technology is known in which a part of an imaging lens or an imaging unit is displaced depending on vibrations to prevent deterioration of an image in order to prevent the captured image from being deteriorated (blurred) by vibrations applied to an image capturing device such as an electronic camera. As an actuator for displacing the imaging unit depending on the vibrations, there has already existed an image capturing device provided with the piezoelectric actuator constituted as described above.

As described in the principle of the piezoelectric actuator, frictionally connected portions (the driving shaft and the movable member) are disposed in a driving mechanism. When impact exceeding a holding force due to the frictional connection is applied to the image capturing device, the movable member deviates, and the imaging unit connected to the movable member is sometimes displaced to an unintended position. In this case, the actuator cannot be momentarily returned exactly to a position before the impact is applied. Therefore, if the blurring correction is continued, the captured image might be deteriorated more. Moreover, the image is rapidly moved owing to the blurring correction after the impact is applied, so a user might feel a sense of incongruity.

The above-described problems are not limited only to the piezoelectric actuator constituted as shown in FIGS. 12A to 15 but are true for actuators including the frictional connection.

BRIEF SUMMARY OF THE INVENTION

According to the present invention, there is provided an image capturing device comprising: an imaging optical system; an imaging unit which converts an object image formed by the imaging optical system into an electric signal; an image processing circuit which generates image data from the electric signal of the imaging unit; a recording circuit which records the image data in a recording medium; and a control circuit.

This image capturing device further comprises: a support member which displaceably supports the imaging unit along a plane perpendicular to an optical axis of the imaging optical system; a position detecting sensor for detecting a position of the imaging unit; an actuator connected to the support member, including an electromechanical conversion unit as a driving source, and having a frictionally connected section in a conversion mechanism for converting an expanding or contracting operation of the electromechanical conversion unit into a driving force to drive the support member; and a vibration detecting sensor which detects vibration.

The control circuit controls the actuator depending on outputs of the vibration detecting sensor and the position detecting sensor so as to prevent the object image from being deteriorated by the vibration.

The control circuit calculates a correction target position of the imaging unit in a predetermined period based on the outputs of the vibration detecting sensor and the position detecting sensor in order to control the actuator.

Such image capturing device is provided with an impact detecting section which detects an impact applied to the image capturing device, and the control circuit sets a present position of the imaging unit detected by the position detecting sensor as the correction target position, when the impact detecting section detects the impact.

Therefore, in the image capturing device of the present invention, since blurring correction is not performed in a case where the impact detecting section detects the impact, the image can be prevented from being deteriorated further by the correction. Especially, even if the impact exceeding a holding force of the frictionally connected section is generated, a large trouble is hardly generated.

Other than that the imaging unit is moved by the actuator in the blurring correction, it can be implemented that the imaging optical system is provided with a blurring correction optical system which displaces a position of the object image by moving the blurring correction optical system by the actuator.

Here, the impact detecting section may be an independent impact sensor such as an acceleration sensor. However, a program module can be disposed to detect the occurrence of the impact utilizing an output of the vibration detecting sensor or the like. To detect the impact by the program module, an input for detecting the impact can be an access error signal of a recording medium drive other than output signals of various sensors such as the vibration detecting sensor and a position sensor.

It can be so constructed that the impact detecting section obtains a change amount of the vibration per unit time from a vibration amount input from the vibration detecting sensor in the predetermined period, and judges that the impact has been applied, when the change amount exceeds a predetermined value.

The impact detecting section can obtain the change amount of the vibration per unit time from the vibration amount input from the vibration detecting sensor in the predetermined period, obtain the change amount per unit time from position information input from the position detecting sensor, and judge that the impact has been applied, when the two change amounts exceed predetermined values, respectively.

The impact detecting section can obtain the change amount per unit time from the vibration amount input from the vibration detecting sensor in the predetermined period, and judge that the impact has been generated, when the change amount exceeds the predetermined value, and occurrence of an error in an access to the recording medium is detected.

Moreover, the present invention can be understood as a blurring correction method performed by the above-described image capturing device.

According to the present invention, there can be provided an image capturing device provided with a blurring correction function and a blurring correction method in which a large trouble is not caused even if an impact exceeding a holding force of a frictionally connected section is applied in a case where an actuator including the frictionally connected section in a mechanism section for converting an expanding and contracting operation of an electromechanical conversion unit into a driving force is utilized as a driving source for blurring correction.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Preferred embodiment of the invention is described below with reference to the accompanying drawings.

First Embodiment

Figure 1:
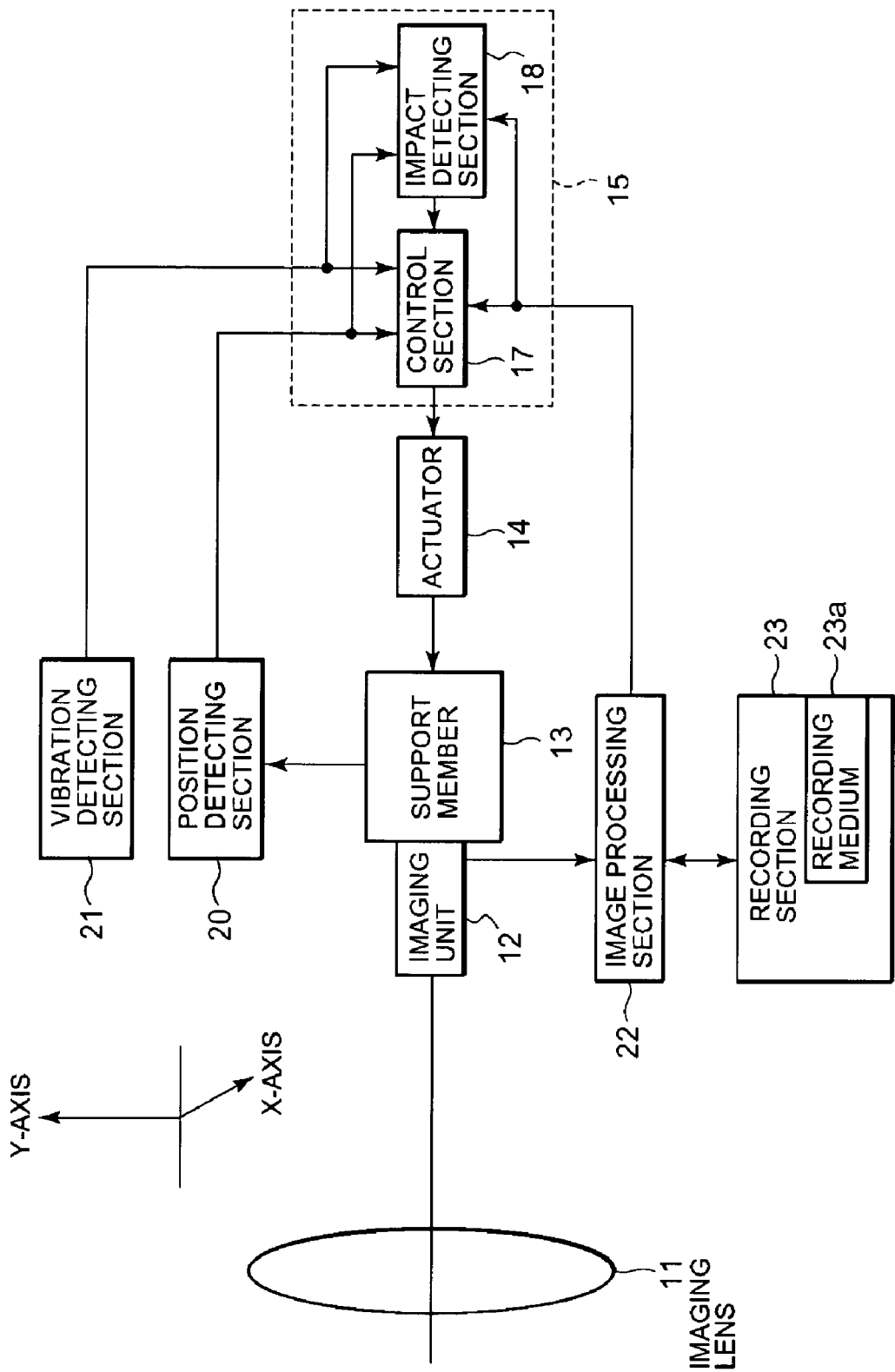
FIG. 1 is a block diagram showing a schematic constitution of an image capturing device provided with a blurring correction function in a first embodiment of the present invention.

FIG. 1 is a block diagram showing a schematic constitution of an image capturing device provided with a blurring correction function in a first embodiment of the present invention.

In FIG. 1, an imaging unit 12 attached to a support member 13 is disposed behind an imaging lens 11 which is an imaging optical system. The support member 13 is supported by the actuator 14 so as to be movable in X-axis and Y-axis directions. This actuator 14 is driven under control of a control section 17 which is control means in a control unit 15. The control unit 15 is provided with an impact detecting section 18 which is impact detecting means for detecting impact applied to and generated within the image capturing device.

The control section 17 is connected to not only the impact detecting section 18 but also a position detecting section 20, a vibration detecting section 21, and an image processing section 22. The position detecting section 20 is position detecting means for detecting a position of the imaging unit 12 such as a positional encoder. The vibration detecting section 21 is vibration detecting means for detecting vibration such as an acceleration sensor. The image processing section 22 is image processing means for generating image data from an electric signal of the imaging unit 12. The image processing section 22 is connected to a recording section 23 as a recording means for recording the image data in a recording medium 23a.

In the present embodiment, the impact detecting section 18 will be described as a program module which analyzes an output of the vibration detecting section 21 to detect an impact, however it is clearly understood that an acceleration sensor or other elements can also be used to detect the impact.

In such constitution, when a light flux from an object (not shown) is taken into the imaging unit 12 via the imaging lens 11, the object image is converted into the electric signal by the imaging unit 12. Moreover, the image data is formed using the electric signal output from this imaging unit 12 by the image processing section 22. The image data is recorded in the recording medium 23a of the recording section 23.

The imaging unit 12 is supported on the support member 13 so as to be displaceable in the X-axis and Y-axis directions along a plane perpendicular to an optical axis of the optical system. The support member 13 is driven in the X-axis and Y-axis directions by performing expanding and contracting operations of the actuator 14 having an electromechanical conversion unit as a driving source. The position of the imaging unit 12 is detected by the position detecting section 20.

Moreover, the control section 17 controls the driving of the actuator 14 so as to prevent an object image from being deteriorated by vibration in response to an output of the vibration detected by the vibration detecting section 21 and an output of the position detecting section 20. This control section 17 calculates a correction target position of the imaging unit 12 based on the outputs of the vibration detecting section 21 and the position detecting section 20 in a predetermined period. In this case, when an impact is detected by the impact detecting section 18, a present position is regarded as the correction target position. That is, in a case where the impact which scale is not less than a predetermined scale is detected, even when the blurring attributable to this impact is occurred, a blurring correction is not performed.

Figure 2:
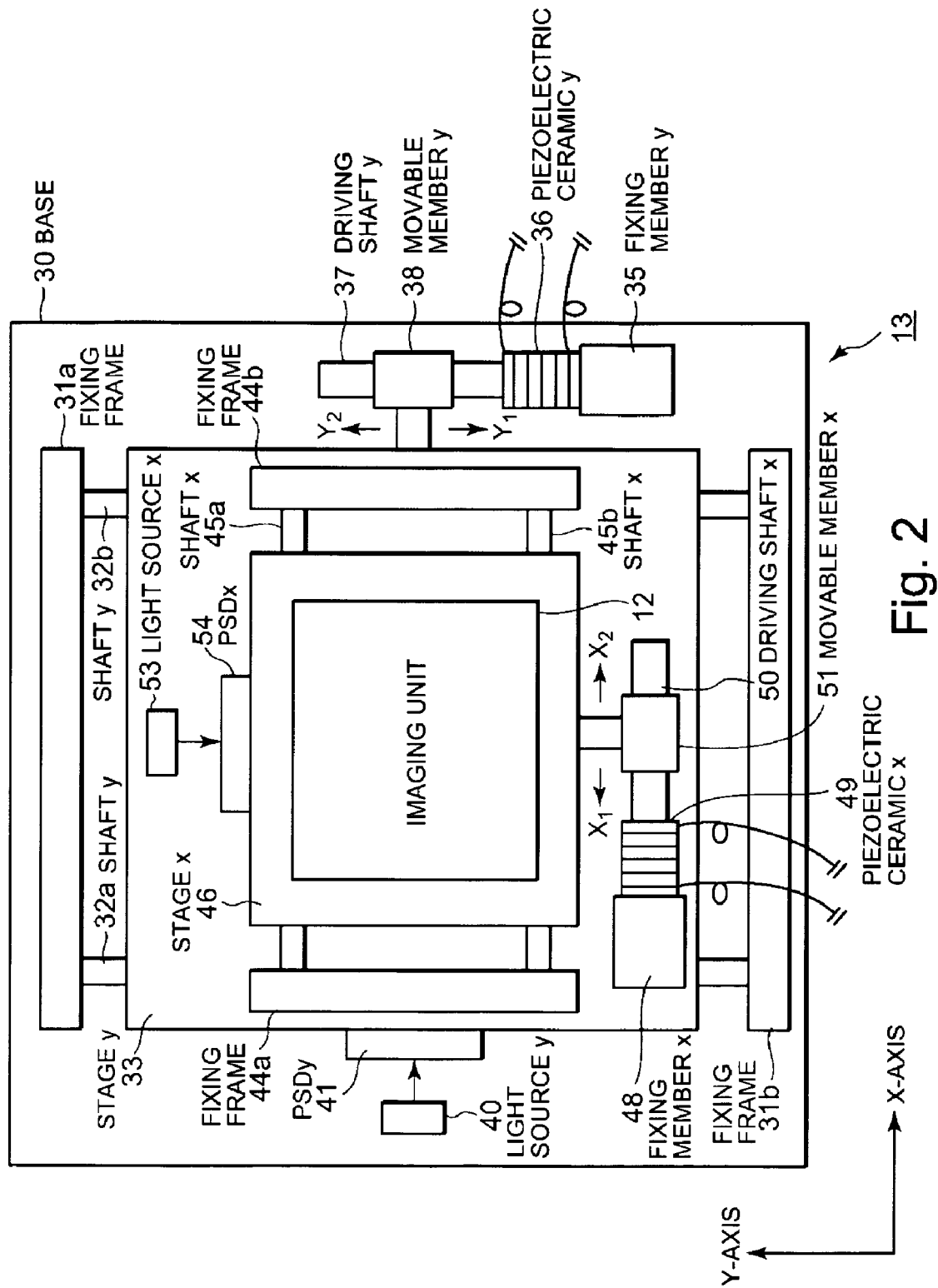
FIG. 2 is a diagram showing a structure of a correction mechanism constituted of a support member 13 and an actuator 14 of FIG. 1.

FIG. 2 is a diagram showing a structure of a correction mechanism constituted of the support member 13 and the actuator 14 of FIG. 1.

In FIG. 2, two extending shafts-y 32a and 32b are disposed between fixing frames 31a and 31b fixed apart from each other on a base 30. Moreover, a stage-y 33 is supported so as to be slidable in the Y-axis direction on these shafts y32a and 32b. A fixing member-y 35 is attached to the vicinity of this stage-y 33. One end portion of a piezoelectric ceramic-y 36 is fixed to this fixing member-y 35. On the other hand, a driving shaft-y 37 is fixed to the other end portion of the piezoelectric ceramic-y 36. A movable member-y 38 attached to the stage-y 33 is frictionally connected to this driving shaft-y 37.

Moreover, a position detecting section (PSD)-y 41 for detecting the position of the stage-y 33 by means of light from a light source-y 40 is attached to a side surface portion of the stage-y 33 in the Y-axis direction.

It is to be noted that a driving signal necessary for expanding and contracting the piezoelectric ceramic-y 36 is supplied from a driving circuit (not shown) in the control unit 15 to an electrode of the piezoelectric ceramic-y 36. Accordingly, the stage-y 33 is supported so as to be movable along the shafts-y 32a and 32b in directions of shown arrows $Y_1$ and $Y_2$ in response to the expansion and contraction movements of the piezoelectric ceramic-y 36.

Similarly, two extending shafts x45a and 45b are disposed between fixing frames 44a and 44b fixed apart from each other on the stage-y 33. Moreover, a stage-x 46 provided with the imaging unit 12 is supported so as to be slidable in the X-axis direction on these shafts-x 45a and 45b. A fixing member-x 48 is attached to the vicinity of this stage-x 46. One end portion of a piezoelectric ceramic-x 49 is fixed to this fixing member-x 48. On the other hand, a driving shaft-x 50 is fixed to the other end portion of the piezoelectric ceramic-x 49. A movable member-x 51 attached to the stage-x 46 is frictionally connected to this driving shaft-x 50.

Moreover, a position detecting section (PSD)-x 54 for detecting the position of the stage-x 46 by means of light from a light source-x 53 is attached to a side surface portion of the stage-x 46 in the X-axis direction.

It is to be noted that a driving signal necessary for expanding and contracting the piezoelectric ceramic-x 49 is supplied from the driving circuit (not shown) in the control unit 15 to an electrode of the piezoelectric ceramic-x 49. Accordingly, the stage-x 46 is supported so as to be movable along the shafts-x 45*a* and 45*b* in directions of shown arrows $X_1$ and $X_2$ in response to the expansion and contraction of the piezoelectric ceramic-x 49.

The position of the imaging unit 12 in the X-axis direction is detected by the light source-x 53 and the PSD-x 54. In this case, when the piezoelectric ceramic-x 49 expands and contracts depending on a detected movement amount, the stage-x 46 moves in the shown arrow $X_1$ and $X_2$ directions, and the position of the imaging unit 12 in the X-axis direction is adjusted.

Similarly, the position of the imaging unit 12 in the Y-axis direction is detected by the light source-y 40 and the PSD-y 41. In this case, when the piezoelectric ceramic-y 36 expands and contracts depending on a detected movement amount, the stage-y 33 moves in the shown arrow $Y_1$ and $Y_2$ directions, and the position of the imaging unit 12 in the Y-axis direction is adjusted.

Figure 3:
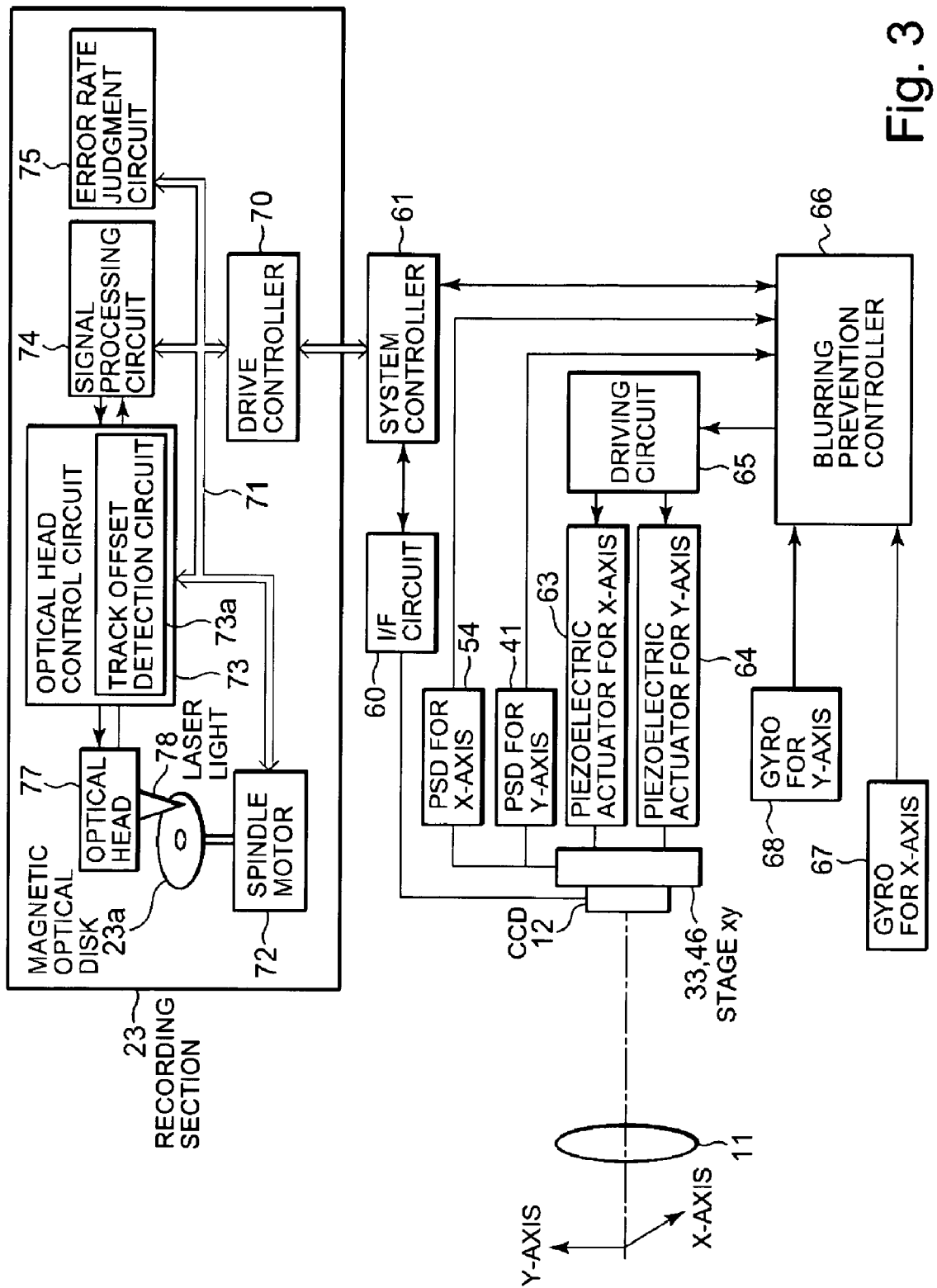
FIG. 3 is a block diagram showing a typical constitution example of the image capturing device in the first embodiment of the present invention.

FIG. 3 is a block diagram showing a typical constitution example of the image capturing device in the present embodiment.

In FIG. 3, the CCD 12 constituting the imaging unit is supported on the stage-x 46 and stage-y 33 so as to be displaceable in the X-axis and Y-axis directions along a plane which is perpendicular to the optical axis of the imaging lens 11. The position of the CCD 12 is obtained, when the stage-x 46 and stage-y 33 are detected by the PSD 54 for the X-axis and the PSD 41 for the Y-axis constituting the position detecting section 20, respectively.

On the other hand, the stage-x 46 and stage-y 33 are driven in the X-axis and Y-axis directions by the expanding and contracting operations of a piezoelectric actuator 63 for the X-axis and a piezoelectric actuator 64 for the Y-axis, respectively.

A blurring prevention controller 66 corresponds to the control unit 15. The blurring prevention controller 66 outputs a control signal to a driving circuit 65 so as to move the stage-x 46 and stage-y 33 to desired positions based on the vibration of the image capturing device detected by a gyro 67 for the X-axis and a gyro 68 for the Y-axis constituting the vibration detecting section 21 and the position of the CCD 12 detected by the PSD 54 for the X-axis and the PSD 41 for the Y-axis. Moreover, the piezoelectric actuator 63 for the X-axis and the piezoelectric actuator 64 for the Y-axis are driven to move the stage-x 46 and stage-y 33 to the desired positions in response to a control signal from the driving circuit 65.

Moreover, in the CCD 12, a light flux from an object (not shown) is taken via the imaging lens 11, and the object image is converted into an electric signal on the CCD 12. The signal is output from the imaging unit 12 to a system controller 61 which is the image processing section 22 via an interface (I/F) circuit 60 to generate image data.

The recording section 23 has a drive controller 70, a spindle motor 72 connected via a bus 71, an optical head control circuit 73 which drives an optical head 77, a signal processing circuit 74, an error rate judgment circuit 75, and the magnetic optical disk 23*a* which is the recording medium.

The drive controller 70 generally controls the recording section 23, and records in or reproduces from the magnetic optical disk 23*a* which is the recording medium based on an instruction of the system controller 61. The magnetic optical disk 23*a* is rotated in a predetermined direction by the spindle motor 72.

The signal processing circuit 74 generates data modulated by a predetermined modulation system during recording, and demodulates a reproduction pulse during reproduction. The optical head control circuit 73 converts recording data into a recording pulse during the recording, and subjects a reproduction signal to automatic gain control (AGC), waveform equalization or the like via the optical head 77 to convert the signal into a pulse during the reproduction.

Moreover, the optical head control circuit 73 includes a track offset detection circuit 73*a*, and an error signal is sent to the drive controller 70 when a track error signal exceeds a threshold value. This signal is transmitted to the system controller 61. The system controller 61 can detect an error in an access to the magnetic optical disk 23*a* in response to this error signal.

During the recording, the optical head 77 generates laser light 78 whose intensity is modulated in response to the recording pulse from the optical head control circuit 73 to irradiate the magnetic optical disk 23*a*. During the reproduction, power of the laser light 78 is controlled to be constant, the magnetic optical disk 23*a* is irradiated, reflected light is received to detect a change of a quantity of the reflected light or rotation of a reflective polarization surface, and the reproduction signal is obtained.

The error rate judgment circuit 75 judges an error rate based on the reproduction pulse input from the signal processing circuit 74. This judgment result is supplied to the system controller 61.

It is to be noted that in the above-described example, the recording medium has been described as the magnetic optical disk, but the present invention is not limited to this example, and the medium may be a card containing a semiconductor memory or a hard disk drive (HDD). When impacts are applied to these recording media during access, the access errors occur. Therefore, these access errors may be utilized in detecting the impacts.

For example, a part of a small-sized HDD for use in a portable electronic device can detect the access error. Such HDD contains a sensor which detects the impact, and stops a recording operation in the disk, when the sensor detects the impact. When such HDD is used in the image capturing device, an impact signal can be obtained from the HDD.

Next, there will be described a blurring correction operation of the image capturing device in the present embodiment with reference to a flowchart of FIG. 4.

When the device enters this routine, it is first judged in step S1 whether or not there is an instruction for starting a blurring correction operation from the system controller 61. Here, when the blurring correction operation is started, the step shifts to steps S2 and S3 to execute sub-routines "X-axis blurring correction" and "Y-axis blurring correction". It is to be noted that there will be described later the sub-routines "X-axis blurring correction" and "Y-axis blurring correction".

Moreover, it is judged in step S4 whether or not there is a command to stop the blurring correction operation from the system controller 61. Here, when there is not any stop command, the step shifts to the step S2, and the described processing is repeated. This is repeated in a predetermined period, for example, 1000 times/sec to 4000 times/sec. On the other hand, when there is the stop command, the image capturing is judged to be ended, thereby ending the present routine.

Figure 4:
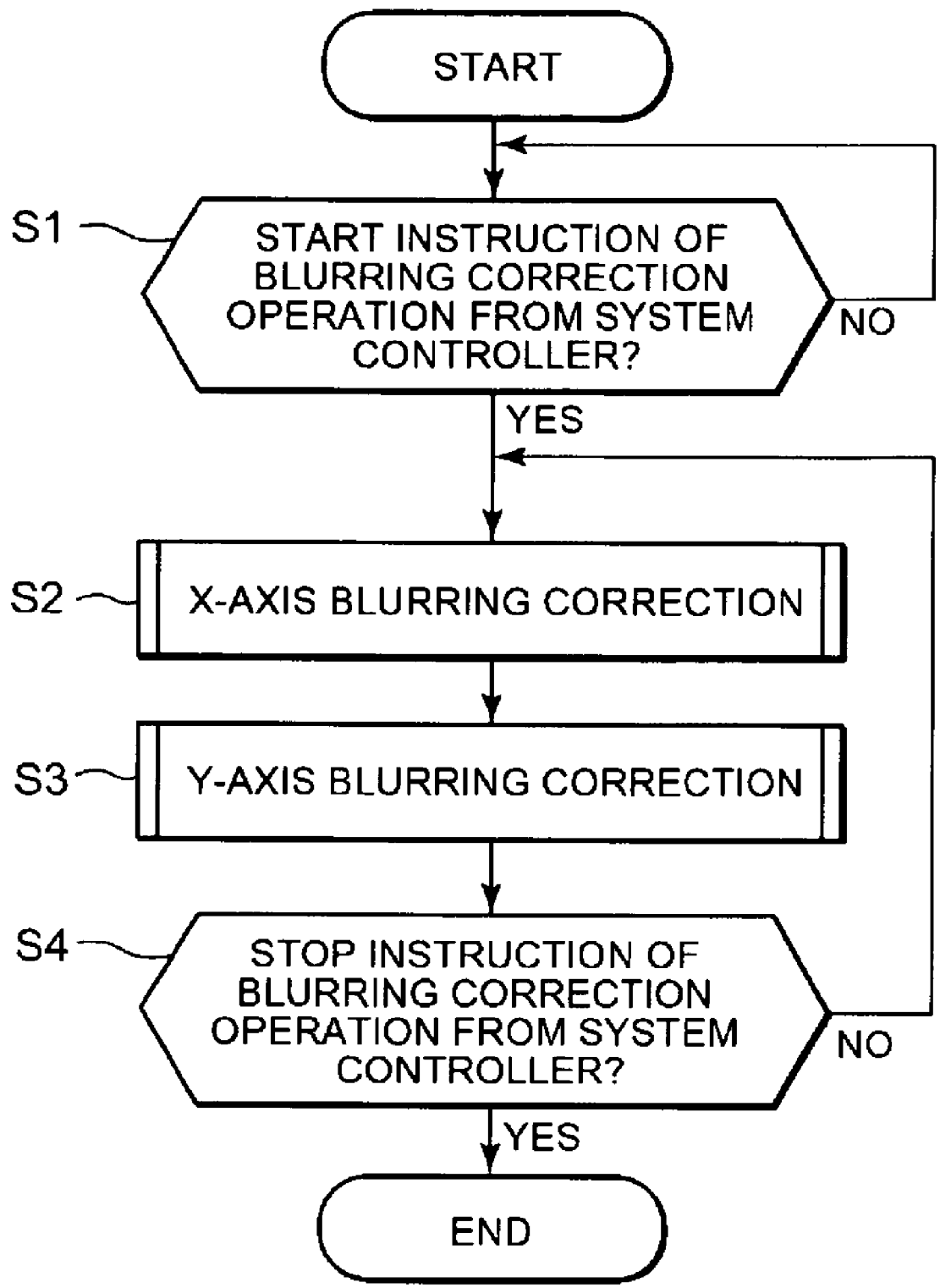
FIG. 4 is a flowchart showing a blurring correction operation of the image capturing device in the first embodiment of the present invention.
Figure 5:
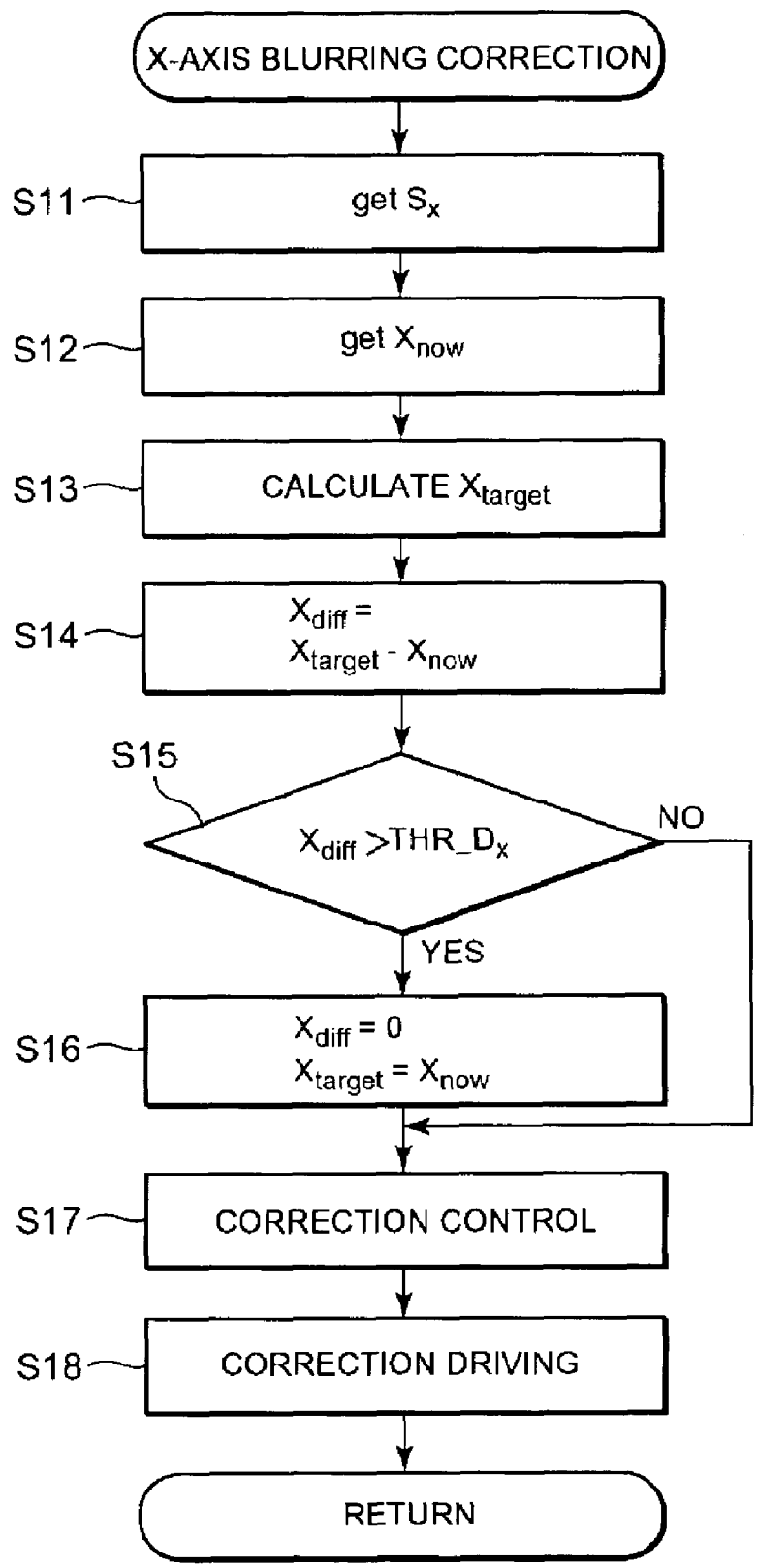
FIG. 5 is a flowchart showing a detailed operation of a sub-routine "X-axis blurring correction" in step S2 of the flowchart of FIG. 4.

FIG. 5 is a flowchart showing a detailed operation of the sub-routine "X-axis blurring correction" in the step S2 of the flowchart of FIG. 4.

When the device enters the present sub-routine, first in step S11, a vibration amount (movement amount) $S_X$ is sampled from the gyro 67 for the X-axis. Next, in step S12, a present position $X_{now}$ is sampled from the PSD 54 for the X-axis.

Furthermore, in step S13, a correction target position $X_{target}$ is calculated based on accumulated values of the vibration amount $S_X$. Next, in step S14, $X_{diff}$ is calculated which is a difference between the correction target position $X_{target}$ and the present position $X_{now}$.

Here, in step S15, the difference value $X_{diff}$ is compared with a predetermined difference threshold value THR_$D_X$. As a result, when the difference value $X_{diff}$ is larger than the difference threshold value THR_$D_X$, the step shifts to step S16 to set "0" to the difference value $X_{diff}$. Furthermore, the present position $X_{now}$ is set to the correction target position $X_{target}$. The control is reset in this manner.

This is because it is judged that a deviation between the target value $X_{target}$ and the present position $X_{now}$ is not a deviation in a usual image capturing operation, and there is a high possibility that a certain impact is added to the image capturing device, when the difference value $X_{diff}$ is larger than the predetermined difference threshold value THR_$D_X$. Therefore, when the $X_{diff}$ is not more than the difference threshold value THR_$D_X$ in the step S15, it is judged that not the impact, but the vibration is occured. Therefore, the step S16 to reset the control is skipped.

Next, in step S17, a control amount for correction is calculated based on the correction target position $X_{target}$ and the present position $X_{now}$. Subsequently, in step S18, the piezoelectric actuator 63 for the X-axis is driven in accordance with the control amount obtained by correction control of the step S17. Thereafter, the processing goes out of the present sub-routine, and shifts to the step S3 of the flowchart of FIG. 4.

Figure 6:
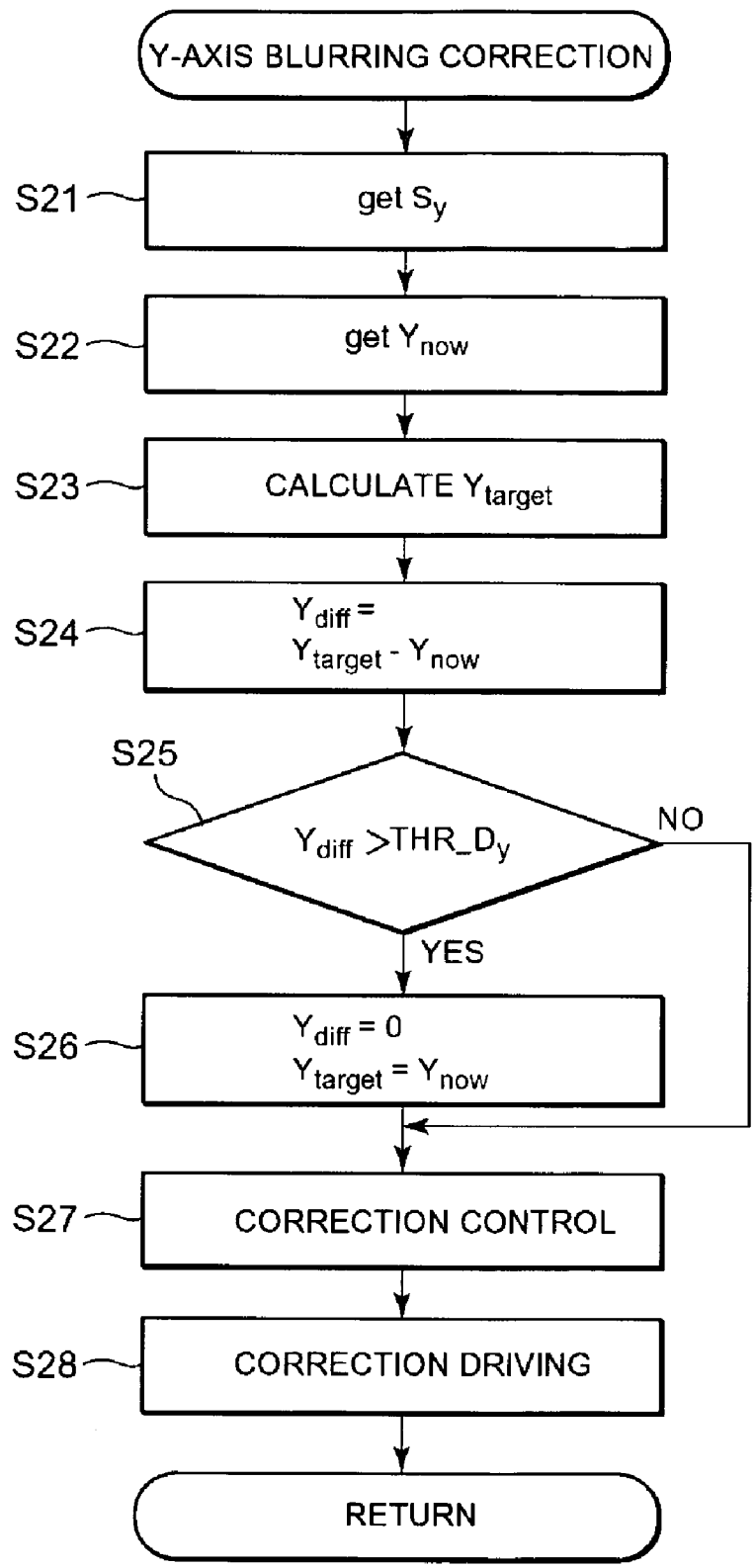
FIG. 6 is a flowchart showing a detailed operation of a sub-routine "Y-axis blurring correction" in step S3 of the flowchart of FIG. 4.

FIG. 6 is a flowchart showing a detailed operation of the sub-routine "Y-axis blurring correction" in the step S3 of the flowchart of FIG. 4.

It is to be noted that the flowchart of the sub-routine "Y-axis blurring correction" of FIG. 6 is the same as that of the sub-routine "X-axis blurring correction" of FIG. 4 except that portions denoted with Y-axis (y) replace those denoted with X-axis (x). Therefore, the flowchart of FIG. 5 is referred to, and detailed description is omitted.

When this sub-routine "Y-axis blurring correction" is completed, the processing shifts to the step S4 of the flowchart of FIG. 4. When any command for stopping the blurring correction operation is not issued from the system controller 61 in the step S4, the step S2 or S3 is executed again. In this case, when the impact is ceased, the usual blurring correction operation is executed.

As described above, according to the first embodiment, even when the impact exceeding a holding force of a frictionally connected section of the piezoelectric actuator is occured, the blurring correction operation can be continued without causing any large trouble.

Next, a second embodiment of the present invention will be described.

In the first embodiment, the difference value $X_{diff}$ is compared with the predetermined difference threshold value THR_$D_X$, and the blurring correction is reset, when the difference value $X_{diff}$ is larger than the difference threshold value THR_$D_X$. On the other hand, in this second embodiment, further a vibration amount S is compared with a predetermined threshold value to detect an impact.

The second embodiment of the present invention will be described hereinafter with reference to a flowchart of FIG. 7.

It is to be noted that since a constitution and an operation of an image capturing device provided with a blurring correction function in the second embodiment are basically similar to those of the first embodiment shown in FIGS. 1 to 6, only different operations will be described, the same parts are denoted with the same reference numerals, and drawing and description are omitted.

Figure 7:
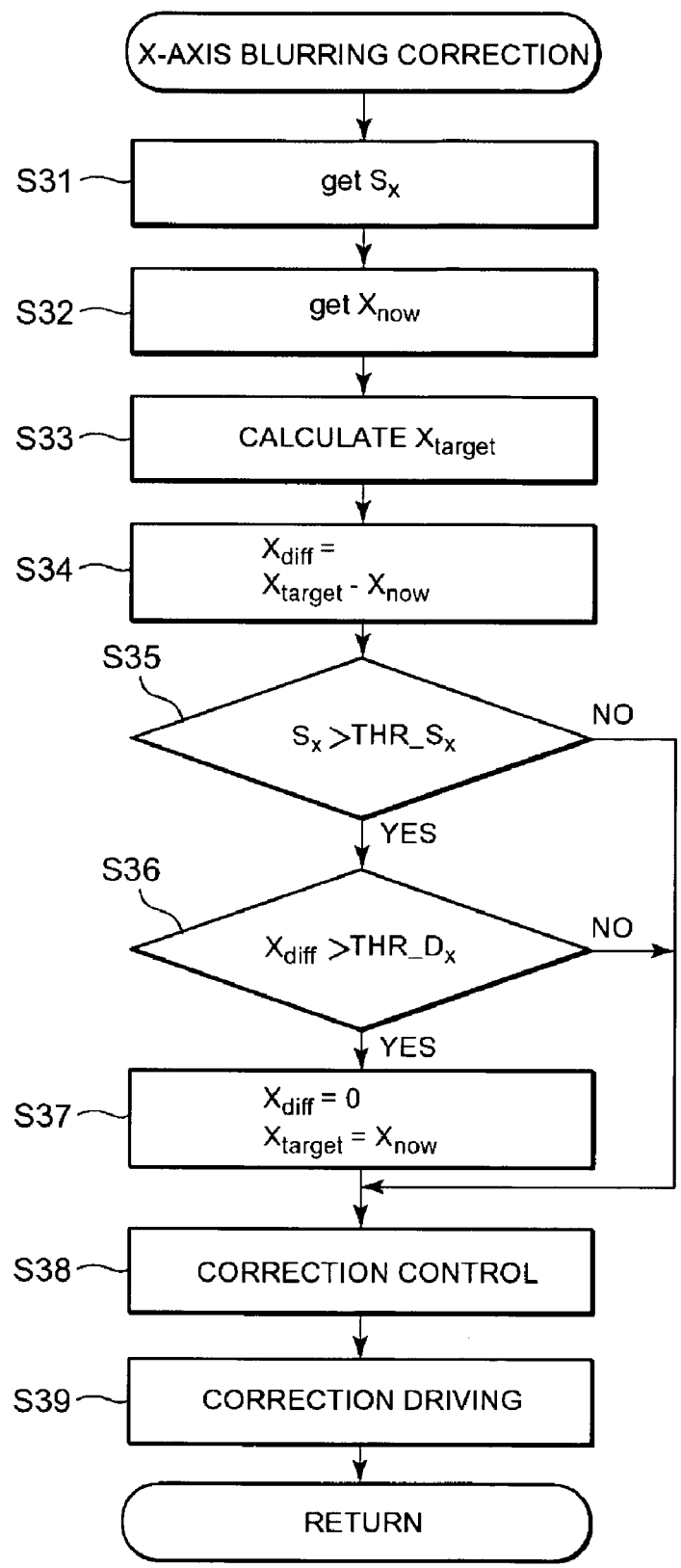
FIG. 7 is a flowchart showing a detailed operation of the sub-routine "X-axis blurring correction" in the step S2 of the flowchart of FIG. 4 in a second embodiment of the present invention.

FIG. 7 is a flowchart showing a detailed operation of a sub-routine "X-axis blurring correction" in the step S2 of the flowchart of FIG. 4 in the second embodiment of the present invention.

It is to be noted that since steps S31 to S34 and S37 to S39 of the present flowchart correspond to the steps S11 to S14 and S16 to S18 of the flowchart of FIG. 5 described above, the processing operations of the corresponding steps are referred to, and detailed description is omitted.

When a difference value $X_{diff}$ between a correction target position $X_{target}$ and a present position $X_{now}$ is calculated in the step S34, a vibration amount $S_X$ obtained in the step S31 is compared with a predetermined vibration amount threshold value THR_$D_X$. Here, when the vibration amount $S_X$ is larger than the predetermined vibration threshold value THR_$D_X$, the step shifts to the step S36, but if not, it is judged that the ordinary blurring is caused. The steps S36 and S37 are skipped to shift to the step S38 for performing correction control.

In the step S36, the difference value $X_{diff}$ is compared with the predetermined difference threshold value THR_$D_X$ only in a case where the vibration amount $S_X$ is judged to be larger than the predetermined vibration amount threshold value THR_$D_X$ in the step S35. As a result, when the difference value $X_{diff}$ is larger than the difference threshold value THR_$D_X$, the step shifts to the step S37 to set "0" to the difference value $X_{diff}$. Moreover, the present position $X_{now}$ is set to the correction target position $X_{target}$ to reset the control. On the other hand, when the difference value $X_{diff}$ is not more than the difference threshold value THR_$D_X$, it is judged that not an impact but an ordinary vibration is applied. Therefore, the step S37 is skipped to shift to the step S38.

Thereafter, when a piezoelectric actuator 63 for the X-axis is driven in the step S39, the processing goes out of the present sub-routine to shift to the step S3 of the flowchart of FIG. 4.

Figure 8:
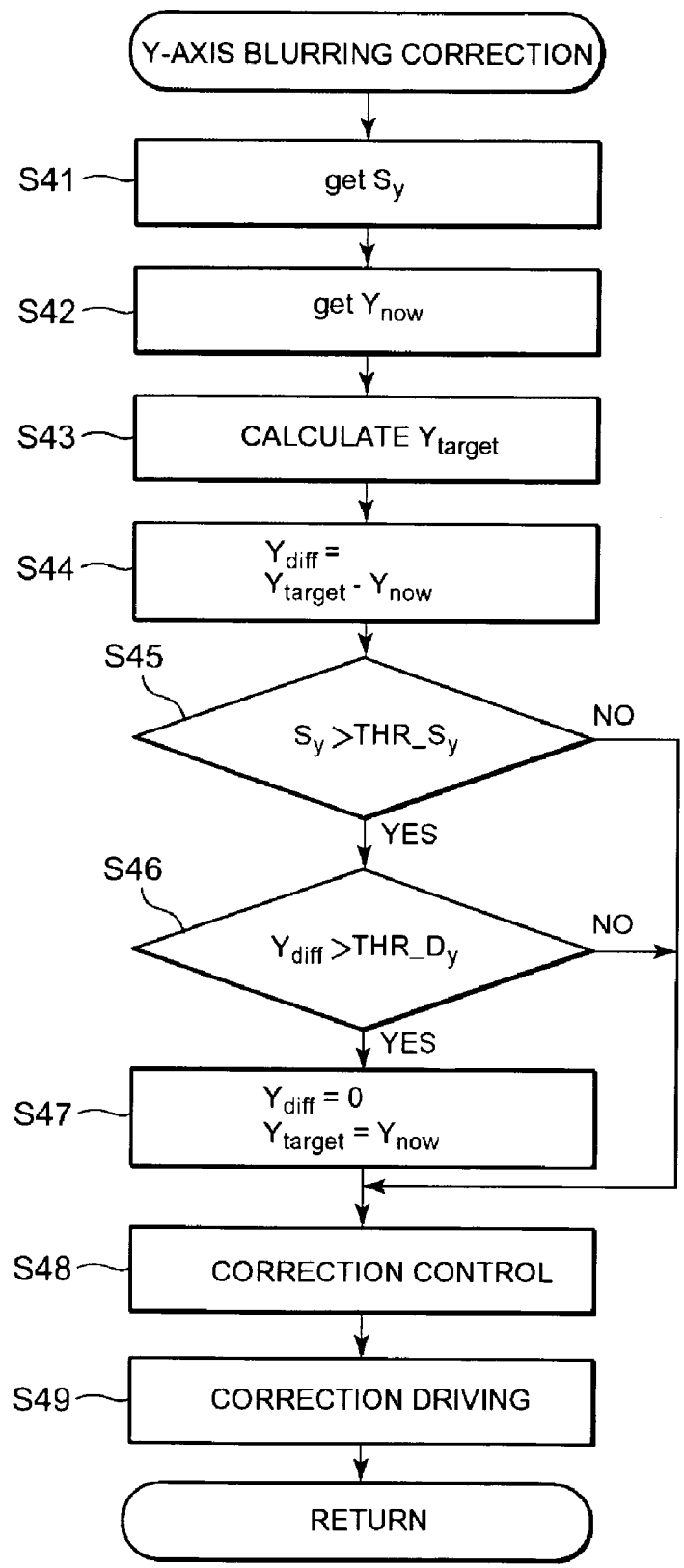
FIG. 8 is a flowchart showing a detailed operation of the sub-routine "Y-axis blurring correction" in the step S3 of the flowchart of FIG. 4 in the second embodiment of the present invention.

FIG. 8 is a flowchart showing a detailed operation of a sub-routine "Y-axis blurring correction" in the step S3 of the flowchart of FIG. 4 in the second embodiment of the present invention.

It is to be noted that the flowchart of the sub-routine "Y-axis blurring correction" of FIG. 8 is the same as that of the sub-routine "X-axis blurring correction" of FIG. 7 except that portions denoted with Y-axis (y) replace those denoted with X-axis (x). Therefore, the flowchart of FIG. 7 is referred to, and detailed description is omitted.

When this sub-routine "Y-axis blurring correction" is completed, the processing shifts to the step S4 of the flowchart of FIG. 4.

As described above, even according to the second embodiment, even when the impact exceeding a holding force of a frictionally connected section of the piezoelectric actuator is applied, the vibration preventing operation can be continued without causing any large trouble.

Next, a third embodiment of the present invention will be described.

In the first embodiment, the difference value $X_{diff}$ is compared with the predetermined difference threshold value THR_$D_X$, and the blurring correction is reset, when the difference value $X_{diff}$ is larger than the difference threshold value THR_$D_X$. However, in this third embodiment, an impact is detected in a case where an error is generated in an access to a medium.

The third embodiment of the present invention will be described hereinafter with reference to a flowchart of FIG. 9.

It is to be noted that since a constitution and an operation of an image capturing device provided with a blurring correction function in the third embodiment are basically similar to those of the first embodiment shown in FIGS. 1 to 6, an only different operation will be described, the same parts are denoted with the same reference numerals, and drawing and description are omitted.

Figure 9:
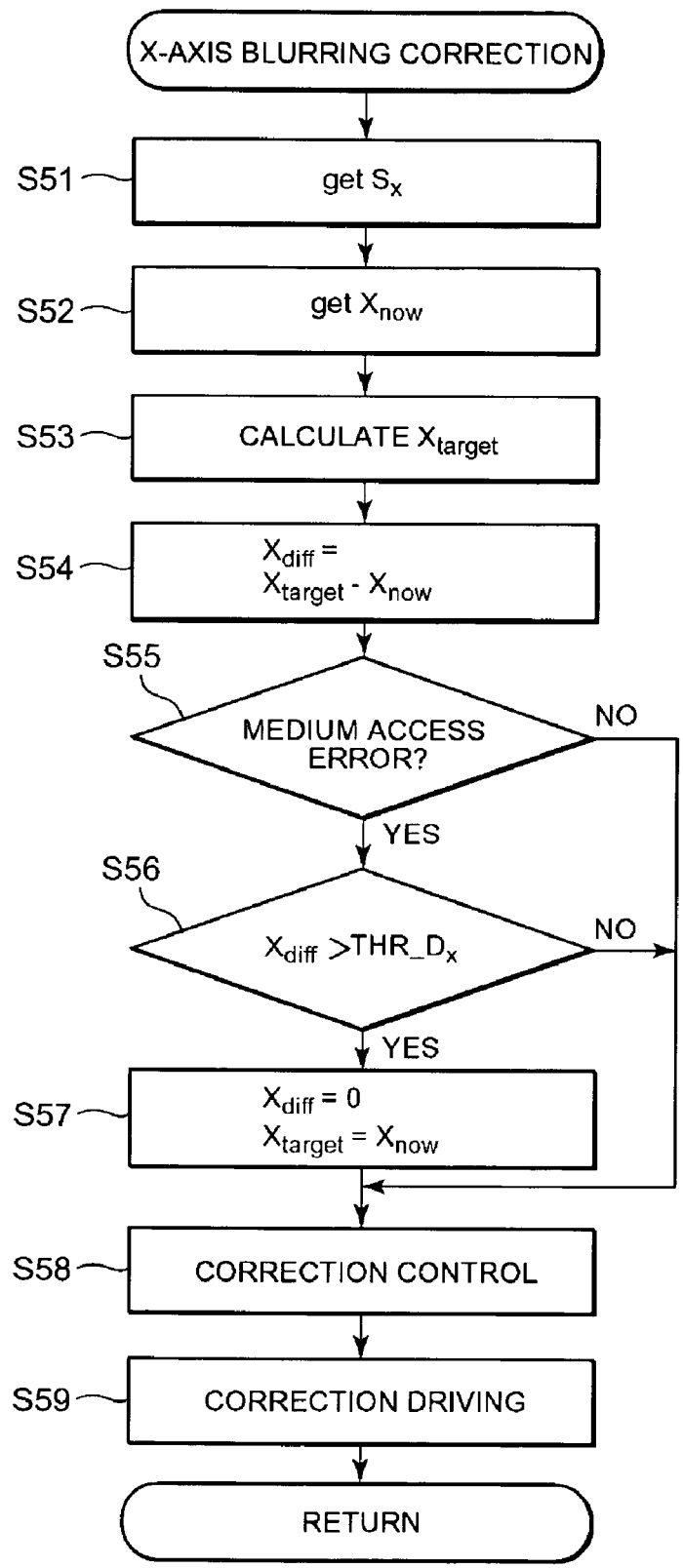
FIG. 9 is a flowchart showing a detailed operation of the sub-routine "X-axis blurring correction" in the step S2 of the flowchart of FIG. 4 in a third embodiment of the present invention.

FIG. 9 is a flowchart showing a detailed operation of the sub-routine "X-axis blurring correction" in the step S2 of the flowchart of FIG. 4 in the third embodiment of the present invention.

It is to be noted that since steps S51 to S54 and S57 to S59 of the present flowchart correspond to the steps S11 to S14 and S16 to S18 of the flowchart of FIG. 5 described above, the processing operations of the corresponding steps are referred to, and detailed description is omitted.

When a difference value $X_{diff}$ between a correction target position $X_{target}$ and a present position $X_{now}$ is calculated in the step S54, it is judged in the subsequent step S55 whether or not an error such as a tracking error is generated in an access to a medium. Here, when the error is generated in the access to the medium, the step shifts to the step S56, but if not, the steps S56 and S57 are skipped to shift to the step S58 for performing correction control.

In the step S56, the difference value $X_{diff}$ is compared with the predetermined difference threshold value $THR\_D_X$ only in a case where the medium access error is generated in the step S55. As a result, when the difference value $X_{diff}$ is larger than the difference threshold value $THR\_D_X$, the step shifts to the step S57 to set "0" to the difference value $X_{diff}$. Moreover, the present position $X_{now}$ is set to the correction target position $X_{target}$ to reset the control. On the other hand, when the difference value $X_{diff}$ is not more than the difference threshold value $THR\_D_X$, it is judged that not the impact but the vibration is applied. Therefore, the step S57 is skipped to shift to the step S58.

Thereafter, when a piezoelectric actuator 63 for the X-axis is driven in the step S59, the processing goes out of the present sub-routine to shift to the step S3 of the flowchart of FIG. 4.

Figure 10:
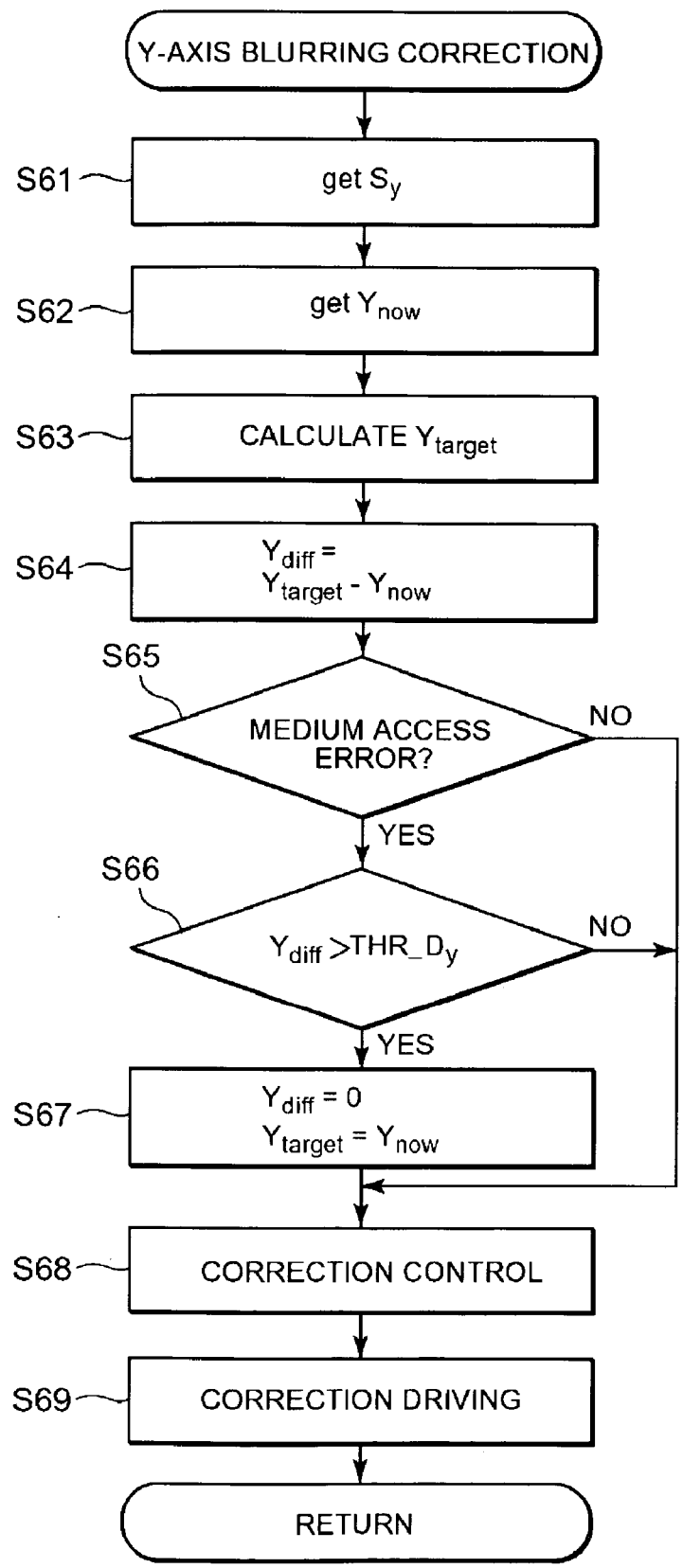
FIG. 10 is a flowchart showing a detailed operation of the sub-routine "Y-axis blurring correction" in the step S3 of the flowchart of FIG. 4 in the third embodiment of the present invention.

FIG. 10 is a flowchart showing a detailed operation of a sub-routine "Y-axis blurring correction" in the step S3 of the flowchart of FIG. 4 in the third embodiment of the present invention.

It is to be noted that the flowchart of the sub-routine "Y-axis blurring correction" of FIG. 10 is the same as that of the sub-routine "X-axis blurring correction" of FIG. 9 except that portions denoted with Y-axis (y) replace those denoted with X-axis (x). Therefore, the flowchart of FIG. 9 is referred to, and detailed description is omitted.

When this sub-routine "Y-axis blurring correction" is completed, the processing shifts to the step S4 of the flowchart of FIG. 4.

As described above, even according to the third embodiment, even when the impact exceeding a holding force of a frictionally connected section of the piezoelectric actuator is occurred, the vibration preventing operation can be continued without causing any large trouble.

Next, a fourth embodiment of the present invention will be described.

In the first to third embodiments, the imaging unit is moved in the X-axis and Y-axis directions to correct the blurring, but the present invention is not limited to this example, and an imaging optical system may be moved to correct the blurring.

Figure 11:
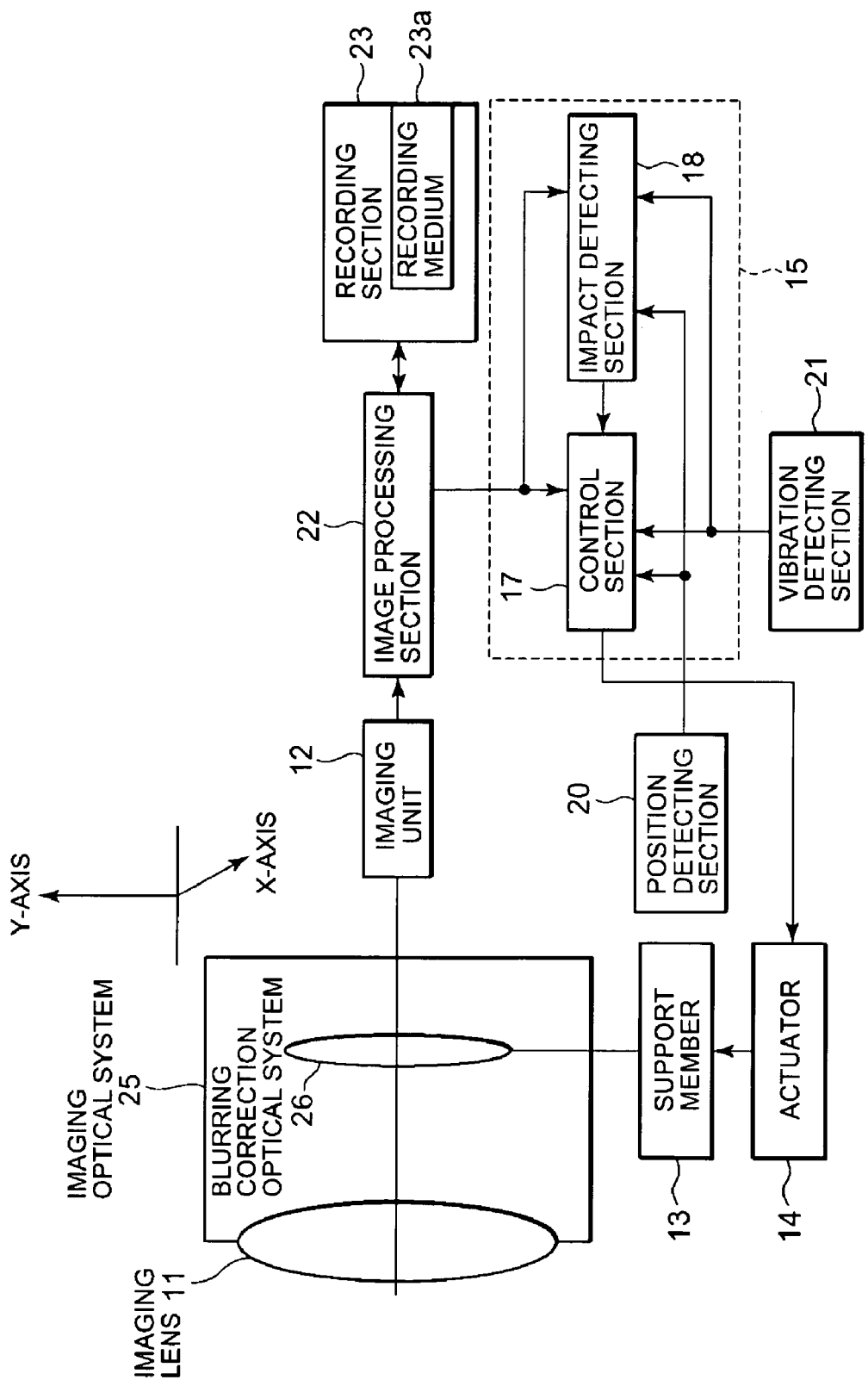
FIG. 11 is a block diagram showing a schematic constitution of an image capturing device provided with a blurring correction function in a fourth embodiment of the present invention.
Figure 12A:
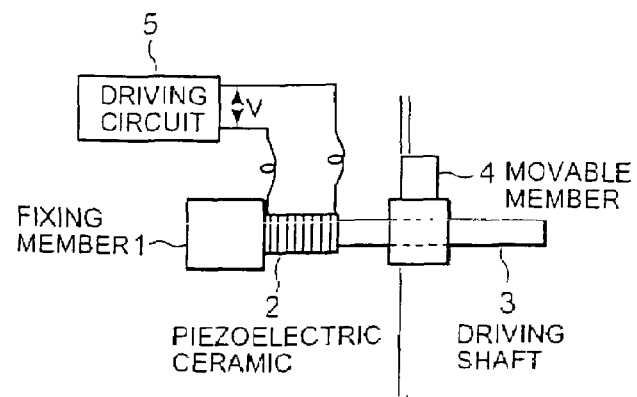
FIGS. 12A, 12B, and 12C are explanatory diagrams of a driving principle of a conventional piezoelectric actuator.
Figure 12B:
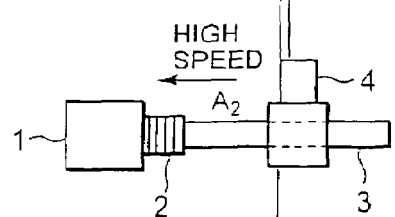
Figure 12C:
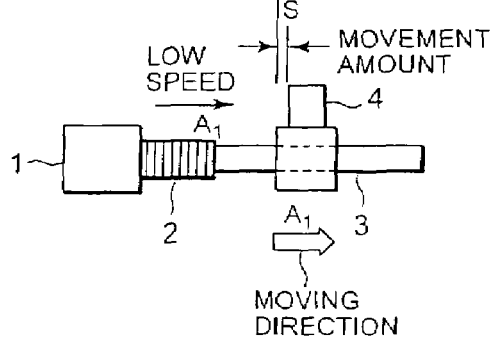
Figure 13:
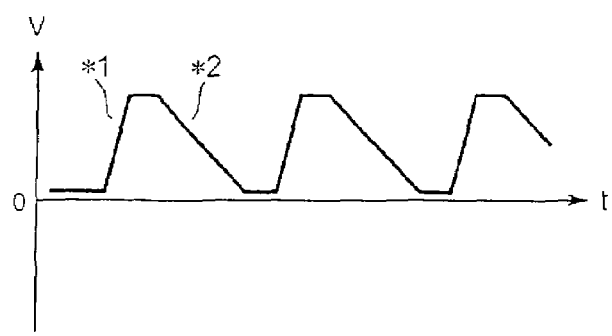
FIG. 13 is a diagram showing an example of a signal waveform supplied to a piezoelectric ceramic 2 in the driving principle of the conventional piezoelectric actuator.
Figure 14A:
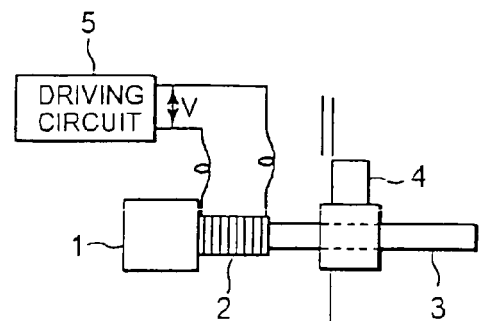
FIGS. 14A, 14B, and 14C are explanatory diagrams of a driving principle of the conventional piezoelectric actuator.
Figure 14B:
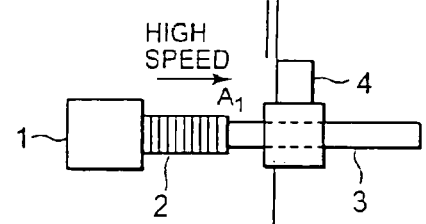
Figure 14C:
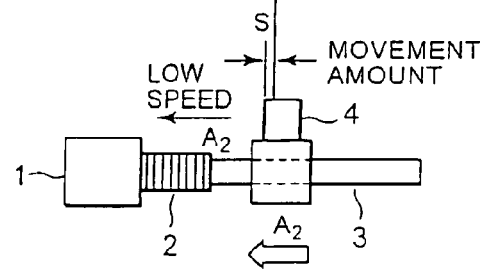
Figure 15:
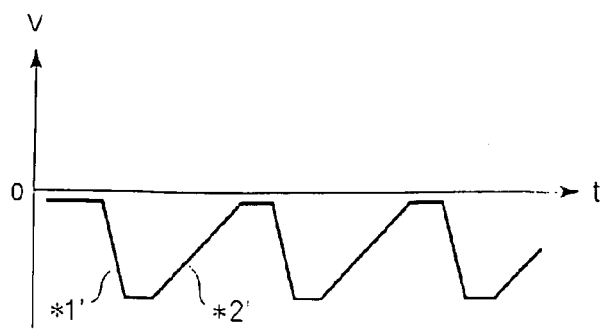
FIG. 15 is a diagram showing an example of the signal waveform supplied to the piezoelectric ceramic 2 in the driving principle of the conventional piezoelectric actuator.

FIG. 11 is a block diagram showing a schematic constitution of an image capturing device provided with a blurring correction function in the fourth embodiment of the present invention.

It is to be noted that since a constitution and an operation of the image capturing device provided with the blurring correction function in the fourth embodiment are basically similar to those of the first embodiment shown in FIGS. 1 to 6, only different constitution and operation will be described, the same parts are denoted with the same reference numerals, and drawing and description are omitted.

In FIG. 11, a blurring correction optical system 26 attached to a support member 13 is disposed behind an imaging lens 11 constituting an imaging optical system 25. Moreover, a light flux passed through the imaging lens 11 and the blurring correction optical system 26 is guided into an imaging unit 12.

In such constitution, when the light flux from an object (not shown) is taken into the imaging unit 12 via the imaging lens 11 and the blurring correction optical system 26, the object image is converted into an electric signal in the imaging unit 12. Moreover, image data is generated from the electric signal output from the imaging unit 12 in an image processing section 22. It is to be noted that the image data is recorded in a recording medium 23a of a recording section 23.

On the other hand, the blurring correction optical system 26 is supported on the support member 13 so as to be displaceable in X-axis and Y-axis directions along a plane which is perpendicular to an optical axis of the imaging optical system. The support member 13 is driven in the X-axis and Y-axis directions by expanding and contracting operations of an actuator 14 using an electromechanical conversion unit as a driving source. A position of the blurring correction optical system 26 is detected by a position detecting section 20.

Moreover, the driving of the actuator 14 is controlled by a control section 17 in response to an output of vibration detected by a vibration detecting section 21 and an output of the position detecting section 20 so as to prevent the object image from being deteriorated by the vibration. When the actuator 14 is driven, the blurring correction optical system 26 is moved via the support member 13, and accordingly a position of the light flux emitted from the object to the imaging unit 12 is displaced.

Furthermore, the control section 17 regards the present position as a correction target position, when the impact detecting section 18 detects an impact in a case where the correction target position of the blurring correction optical system 26 is calculated based on the outputs of the vibration detecting section 21 and the position detecting section 20 in a predetermined period.

As described above, according to the fourth embodiment, even when the impact exceeding a holding force of a frictionally connected section of the piezoelectric actuator is occurred, the vibration preventing operation can be continued without causing any large trouble.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An image capturing device having a blurring correction function, comprising:
   an imaging optical system;
   an imaging unit which converts an object image formed by the imaging optical system into an electric signal;

an image processing circuit which generates image data from the electric signal of the imaging unit;

a recording circuit which records the image data in a recording medium;

a support member which displaceably supports the imaging unit along a plane which is perpendicular to an optical axis of the imaging optical system;

a position detecting sensor for detecting a position of the imaging unit;

an actuator connected to the support member, including an electromechanical conversion unit as a driving source, and having a frictionally connected section in a conversion mechanism for converting an expanding or contracting operation of the electromechanical conversion unit into a driving force to drive the support member;

a vibration detecting sensor which detects a vibration;

a control circuit which controls the actuator depending on outputs of the vibration detecting sensor and the position detecting sensor so as to prevent the object image from being deteriorated by the vibration and which calculates a correction target position of the imaging unit in a predetermined period based on the outputs of the vibration detecting sensor and the position detecting sensor in order to control the actuator; and an impact detecting section which detects an impact at least one of applied to and generated within the image capturing device, wherein the control circuit regards a present position of the imaging unit detected by the position detecting sensor as the correction target position, when the impact detecting section detects the impact.

2. The image capturing device according to claim 1, wherein the impact detecting section obtains a change amount of the vibration per unit time from a vibration amount input from the vibration detecting sensor in the predetermined period, and judges that the impact has been generated, when the change amount exceeds a predetermined value.

3. The image capturing device according to claim 1, wherein the impact detecting section obtains a change amount of the vibration per unit time from a vibration amount input from the vibration detecting sensor in the predetermined period, obtains the change amount per unit time from position information input from the position detecting sensor, and judges that the impact has been generated, when the two change amounts exceed predetermined values, respectively.

4. The image capturing device according to claim 1, wherein the impact detecting section obtains a change amount per unit time from a vibration amount input from the vibration detecting sensor in the predetermined period, and judges that the impact has been generated, when the change amount exceeds a predetermined value, and generation of an error in an access to the recording medium is detected.

5. An image capturing device having a blurring correction function, comprising:

an imaging optical system;

a blurring correction optical system which is a part of the imaging optical system and which displaces a position of an object image;

an imaging unit which converts the object image formed by the imaging optical system into an electric signal;

an image processing circuit which generates image data from the electric signal of the imaging unit;

a recording circuit which records the image data in a recording medium;

a support member which displaceably supports the blurring correction optical system along a plane which is perpendicular to an optical axis of the imaging optical system;

a position detecting sensor for detecting a position of the blurring correction optical system;

an actuator connected to the support member, including an electromechanical conversion unit as a driving source, and having a frictionally connected section in a conversion mechanism for converting an expanding or contracting operation of the electromechanical conversion unit into a driving force to drive the support member;

a vibration detecting sensor which detects a vibration;

a control circuit which controls the actuator depending on outputs of the vibration detecting sensor and the position detecting sensor so as to prevent the object image from being deteriorated by the vibration and which calculates a correction target position of the blurring correction optical system in a predetermined period based on the outputs of the vibration detecting sensor and the position detecting sensor in order to control the actuator; and an impact detecting section which detects an impact generated in the image capturing device, wherein a present position is regarded as the correction target position, when the impact detecting section detects the impact.

6. The image capturing device according to claim 5, wherein the impact detecting section obtains a change amount of the vibration per unit time from a vibration amount input from the vibration detecting sensor in the predetermined period, and judges that the impact has been generated, when the change amount exceeds a predetermined value.

7. The image capturing device according to claim 5, wherein the impact detecting section obtains a change amount per unit time from a vibration amount input from the vibration detecting sensor in the predetermined period, obtains the change amount of the position per unit time from position information input from the position detecting sensor, and judges that the impact has been generated, when the two change amounts exceed predetermined values, respectively.

8. The image capturing device according to claim 5, wherein the impact detecting section obtains a change amount of the vibration per unit time from a vibration amount input from the vibration detecting sensor in the predetermined period, and judges that the impact has been generated, when the change amount exceeds a predetermined value, and generation of an error in an access to the recording medium is detected.

9. A blurring correction method in an image capturing device which moves an imaging unit in a direction crossing an optical axis of an optical system at right angles in a predetermined period to prevent an object image from being deteriorated by a vibration by use of an actuator having a friction driving section for operating by means of an electromechanical conversion unit as a driving source, and converting an expanding or contracting operation of the electromechanical conversion unit into a driving force, the method comprising:

detecting the vibration, a position of the imaging unit, and an impact in predetermined periods;

calculating a correction target position of the imaging unit based on a detected vibration detection output and the detected position of the imaging unit to correct the deterioration of the object image due to the vibration; and moving the imaging unit to the calculated correction target position, when any impact is not detected, and setting the position of the imaging unit at that time as the correction target position to prevent the imaging unit from being driven, when the impact is detected, wherein in the detecting of the impact, it is judged that the impact has been occurred, when a change amount per unit time of the vibration detection output obtained in the predetermined period is not less than a predetermined value.

10. A blurring correction method in an image capturing device which moves an imaging unit in a direction crossing an optical axis of an optical system at right angles in a predetermined period to prevent an object image from being deteriorated by a vibration by use of an actuator having a friction driving section for operating by means of an electromechanical conversion unit as a driving source, and converting an expanding or contracting operation of the electromechanical conversion unit into a driving force, the method comprising:

detecting the vibration, a position of the imaging unit, and an impact in predetermined periods;

calculating a correction target position of the imaging unit based on a detected vibration detection output and the detected position of the imaging unit to correct the deterioration of the object image due to the vibration; and moving the imaging unit to the calculated correction target position, when any impact is not detected, and setting the position of the imaging unit at that time as the correction target position to prevent the imaging unit from being driven, when the impact is detected, wherein in the detecting of the impact, it is judged that the impact has been generated, when a change amount per unit time of the vibration detection output obtained in the predetermined period is not less than a predetermined value, and a change amount of the position of the imaging unit obtained in the predetermined period is not less than a predetermined value.

11. A blurring correction method in an image capturing device which moves a blurring correction optical system in a direction crossing an optical axis at right angles in a predetermined period to prevent an object image from being deteriorated by a vibration by use of an actuator having a friction driving section for operating by means of an electromechanical conversion unit as a driving source, and converting an expanding or contracting operation of the electromechanical conversion unit into a driving force, the method comprising:

detecting the vibration, a position of the blurring correction optical system, and an impact in predetermined periods;

calculating a correction target position of the blurring correction optical system based on a detected vibration detection output and the detected position of the blurring correction optical system to correct the deterioration of the object image due to the vibration; and moving the blurring correction optical system to the calculated correction target position, when any impact is not detected, and setting the position of the blurring correction optical system at that time as the correction target position to stop the driving of the blurring correction optical system, when the impact is detected, wherein in the detecting of the impact, it is judged that the impact has been generated, when a change amount per unit time of the vibration detection output obtained in the predetermined period is not less than a predetermined value.

12. A blurring correction method in an image capturing device which moves a blurring correction optical system in a direction crossing an optical axis at right angles in a predetermined period to prevent an object image from being deteriorated by a vibration by use of an actuator having a friction driving section for operating by means of an electromechanical conversion unit as a driving source, and converting an expanding or contracting operation of the electromechanical conversion unit into a driving force, the method comprising:

detecting the vibration, a position of the blurring correction optical system, and an impact in predetermined periods;

calculating a correction target position of the blurring correction optical system based on a detected vibration detection output and the detected position of the blurring correction optical system to correct the deterioration of the object image due to the vibration; and moving the blurring correction optical system to the calculated correction target position, when any impact is not detected, and setting the position of the blurring correction optical system at that time as the correction target position to stop the driving of the blurring correction optical system, when the impact is detected, wherein in the detecting of the impact, it is judged that the impact has been generated, when a change amount per unit time of the vibration detection output obtained in the predetermined period is not less than a predetermined value, and a change amount of the position of the blurring correction optical system obtained in the predetermined period is not less than a predetermined value.

* * * * *